(12) United States Patent
Kertesz et al.

(10) Patent No.: US 7,984,931 B2
(45) Date of Patent: Jul. 26, 2011

(54) FLUID LINE

(75) Inventors: Janos Kertesz, Hofheim (DE); Jerome Chateau, Metz (FR); Uwe Wickel, Schrecksbach (DE)

(73) Assignee: Norma Germany GmbH, Maintal (DE)

( * ) Notice: Subject to any disclaimer, the term of this patent is extended or adjusted under 35 U.S.C. 154(b) by 283 days.

(21) Appl. No.: 11/900,487

(22) Filed: Sep. 12, 2007

(65) Prior Publication Data
US 2008/0007044 A1  Jan. 10, 2008

(30) Foreign Application Priority Data

Jun. 30, 2006 (EP) .................................. 06405280
Sep. 15, 2006 (DE) .......................... 10 2006 043 461

(51) Int. Cl.
*F16L 39/00* (2006.01)
(52) U.S. Cl. ........ 285/319; 285/308; 285/331; 285/921; 138/109
(58) Field of Classification Search .................. 285/319, 285/308, 921, 321, 331, 330, 235, 237; 138/109, 138/120, 155, 177, DIG. 11, 178 G
See application file for complete search history.

(56) References Cited

U.S. PATENT DOCUMENTS

| | | | | |
|---|---|---|---|---|
| 1,277,976 A | * | 9/1918 | Mann | 285/295.2 |
| 2,670,884 A | * | 3/1954 | Swartz | 222/490 |
| 3,327,030 A | * | 6/1967 | Reifenhauser | 264/46.1 |
| 3,533,113 A | * | 10/1970 | Stamberger | 5/654 |
| 5,586,791 A | * | 12/1996 | Kirchner et al. | 285/179 |
| 5,636,875 A | * | 6/1997 | Wasser | 285/21.1 |
| 5,992,895 A | * | 11/1999 | Steinkamp | 285/45 |
| 6,318,410 B1 | * | 11/2001 | Miyajima et al. | 138/109 |
| 6,622,756 B2 | * | 9/2003 | Berninger et al. | 138/121 |
| 6,837,525 B2 | * | 1/2005 | Miyajima | 285/319 |
| 7,284,774 B2 | * | 10/2007 | Bauer et al. | 285/319 |

FOREIGN PATENT DOCUMENTS

| | | |
|---|---|---|
| DE | 195 29 830 | 3/1997 |
| EP | 1 204 525 | 2/2003 |
| EP | 1 378 701 | 1/2004 |

\* cited by examiner

*Primary Examiner* — James M Hewitt
*Assistant Examiner* — Jay R Ripley
(74) *Attorney, Agent, or Firm* — Lucas & Mercanti, LLP; Klaus P. Stoffel

(57) ABSTRACT

A fluid line of thermoplastic material includes a first end section integral with a principal part of the fluid line which is at least partially undulated. A first holding rib engages behind at least one locking projection of a connecting ring. The ring engages behind a second holding rib on a second end section of the pipe. The first end section has an essentially conical initial section located adjacent the principal part of the fluid line. The initial section has an outer diameter which increases in a direction toward the free end of the first end section. The initial section is adjacent to an intermediate section whose outer diameter decreases from the greatest diameter of the initial section to the smallest diameter of a locking groove for the engagement of a first locking projection.

8 Claims, 3 Drawing Sheets

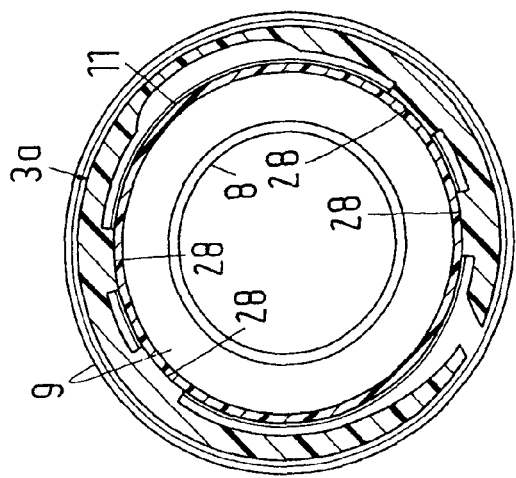
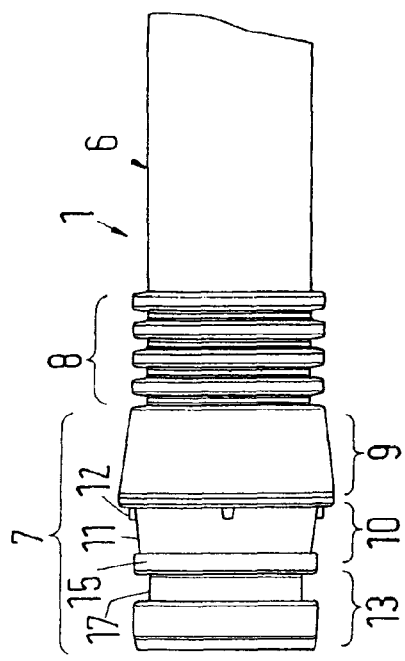
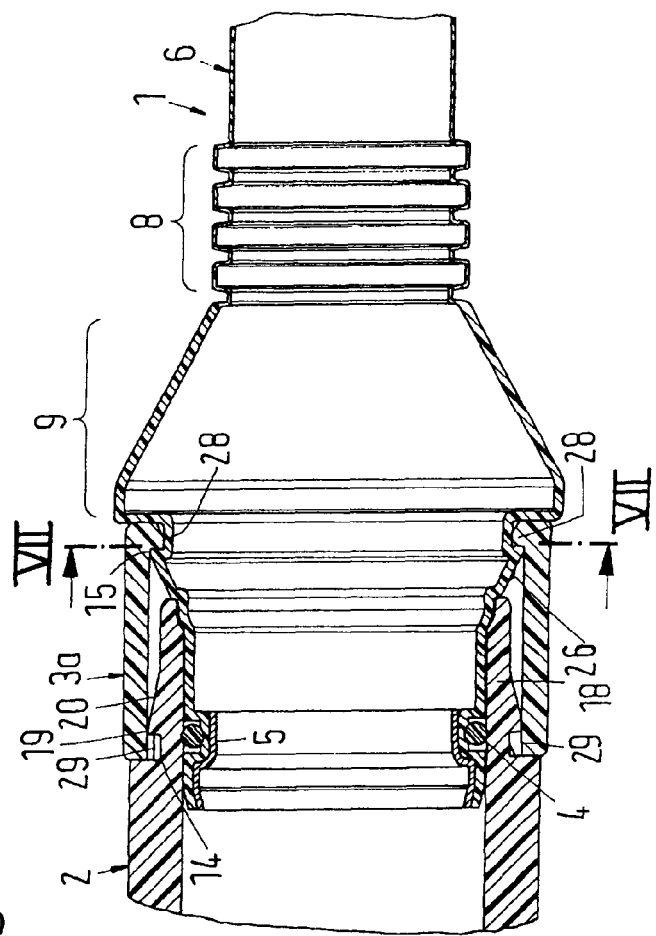

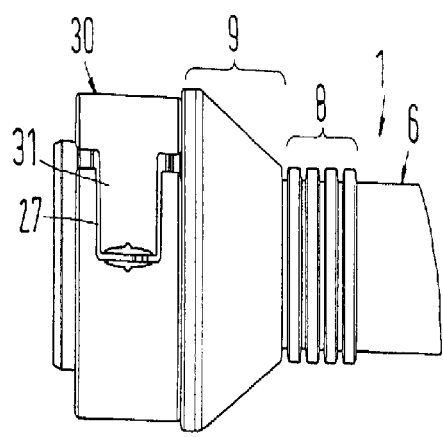
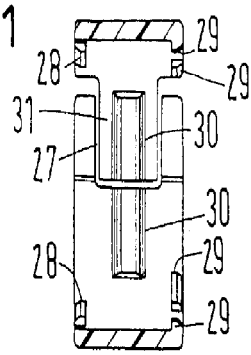
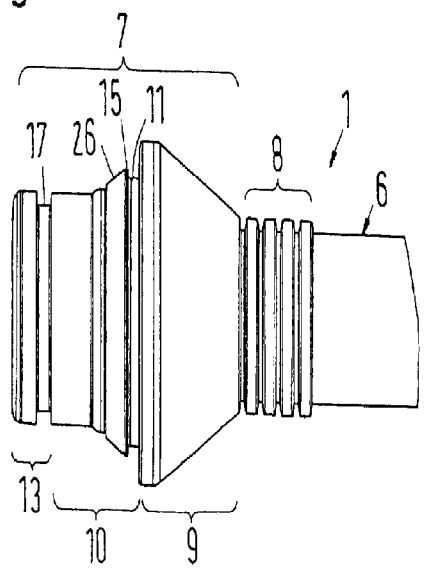
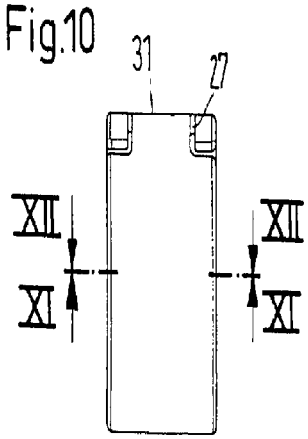
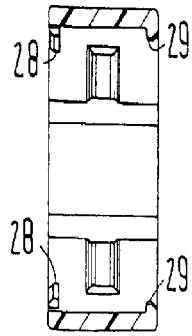
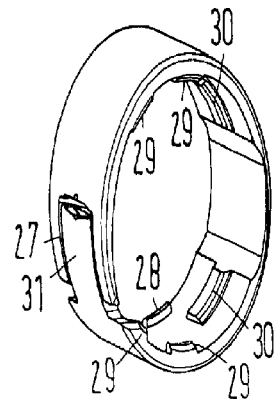

FLUID LINE

BACKGROUND OF THE INVENTION

1. Field of the Invention

The present invention relates to a fluid line of thermoplastic material. The fluid line includes at least one first end section which is formed integrally with a principal part of the fluid line which is at least partially undulated, and at least one outer circumferential sealing ring receiving groove and a first holding rib for engaging behind at least one first locking projection of a connecting ring. The connecting ring is provided with at least one second locking projection for engaging behind a second holding rib on a second end section of the pipe. The first end section can be inserted into the second end section in order to connect the fluid line to the pipe by means of the connecting ring.

2. Description of the Related Art

A fluid line of the above-described type is known from EP 1378701 A1. The fluid line is used primarily in motor vehicles, for example, as a fuel line or a water line.

The fluid line is usually manufactured by extrusion blow molding in a corrugator. The undulation of the pipe has the purpose of achieving a greater flexibility of the fluid line in order to adapt the fluid line to the tight space conditions in the motor vehicle by bending the pipe. However, the first end section must have a high bending stiffness in order to hold the connection of the fluid line with the pipe, e.g. a pipe piece, in such a way that it is capable of bearing loads and is tight. Therefore, in the known fluid line, the wall of the first end section is constructed with the appropriate thickness. Simultaneously, the wall of the principal part of the fluid line adjacent the first end section is constructed at least in the non-undulated sections at least with the same thickness as the first end section. On the other hand, the thickness of the wall of the undulations in the undulated sections of the principal part is only slightly reduced during blow molding. Consequently, in spite of the undulations and particularly if the undulations extend only over some sections of the pipe, the fluid line is still more bending resistant than desired and, consequently, requires a large amount of material.

SUMMARY OF THE INVENTION

Therefore, it is the primary object of the present invention to provide a fluid line of the above-described type which is more flexible and requires less material.

In accordance with the present invention, the first end section has an essentially conical initial section located adjacent the principal part of the fluid line, wherein the essentially conical end section has an outer diameter which increases in the direction toward the free end of the first end section which is not connected to the principal part past at least the greatest shaft diameter of the principal part. The initial section is followed by an intermediate section whose outer diameter decreases from the greatest diameter of the initial section to the smallest diameter of a locking groove which serves for the engagement of a first locking projection. The wall of the first end section is stiffer than the entire wall of the principal part of the fluid line.

The essentially conical shape of the initial section of the first end section makes it possible that excessively large steps of the outer diameter in the first end section and in the connecting ring can be avoided because the end sections are inserted into one another and the connecting ring must engage over both end sections. In the same manner, steps of the outer diameter in the initial section can be avoided in order to make the outer diameters of the two holding ribs essentially equal and, thus, to construct also the outer diameter of the connecting ring as much as possible without steps. Moreover, the stepless shape of the conical initial section has the advantage that it requires less material as compared to a stepped shape and its wall thickness is not reduced during the blow or vacuum molding on the area of any larger diameter steps as a result of the expansion of the plastic material and, thus, its stiffness is also not reduced.

The greater stiffness of the first end section as compared to the principal part of the fluid line can be avoided by making the wall thickness of the first end section at least twice the wall thickness of the principal part of the fluid line.

Consequently, the wall of the principal part of the fluid line can be made thinner and, thus, more flexible and, as it relates to the length, with less material than the first end section. Accordingly, the wall thickness of the first end section may be about 1.5 to 3 mm and the wall thickness of the principal part of the fluid line may be about 0.3 to 1.4 mm.

The greater wall thickness of the first end section can be achieved in the extrusion blow or vacuum molding by means of a corrugator by reducing the circumferential speed of the corrugator as compared to the feeding speed of the molten plastic material during the molding of the first end section.

As a an alternative or additionally, it may be ensured that the first end section has at least one of the reinforcing materials from the group of glass fibers, mineral fibers, metal-fibers and glass spheres.

The first end section is preferably provided with a tooth for engaging between teeth of the connecting ring. This makes it possible to secure the connecting ring and the first end section in such a relative position against rotation that an expandable connecting ring can be easily expanded in order to disengage the locking connection.

It is preferably also ensured that the sealing ring receiving groove has a support ring at its radially inner side. This support ring, which is preferably composed of metal, additionally ensures that after the manufacture of the connection between the fluid line and the pipe the sealing ring receiving groove is not deformed under the pressure of the sealing ring, so that the connection remains tight. Moreover, any non-round shape of the sealing ring receiving groove can be compensated.

In addition, the sealing ring receiving groove may have a rib on its radially inner side. The sealing ring receiving groove is then stiff in itself in the manner of a corrugation.

It is preferably also ensured that the sealing ring has at least one sealing lip and is injection molded of elastomer material into the sealing ring receiving groove. Such a sealing ring has a high sealing capacity and does not have to be mounted separately.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 5 is a side view of the fluid line according to the invention;

FIG. 6 is a modified arrangement according to FIG. 1 in an axial sectional view;

FIG. 7 is the sectional view VII-VII of FIG. 6;

FIG. 8 is a side view of the connection arrangement of FIG. 6, however, without the pipe to which the fluid line is connected;

FIG. 9 is a side view of the fluid line of arrangement of FIG. 6;

FIG. 10 is a side view of a connecting ring of the connection arrangement according to FIG. 6;

FIG. 11 is the sectional view XI-XI of FIG. 10;

FIG. 12 is the sectional view XII-XII of FIG. 10; and

FIG. 13 is a perspective view of the connecting ring of the connection arrangement of FIG. 6.

DETAILED DESCRIPTION OF THE INVENTION

Figure 1:
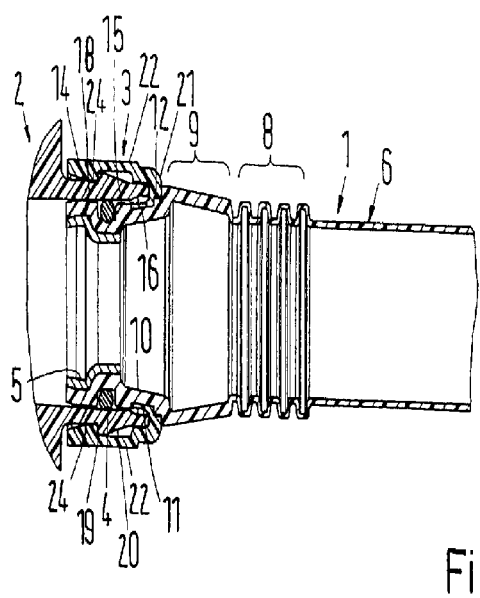
FIG. 1 is an axial sectional view of a connection arrangement according to the present invention with a fluid line according to the invention.
Figure 2:
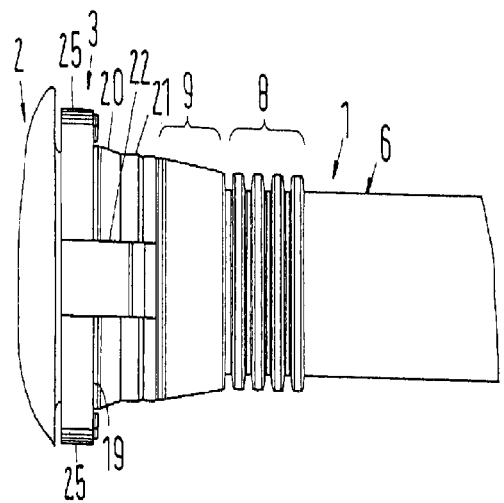
FIG. 2 is a side view of the connection arrangement of FIG. 1.
Figure 4:
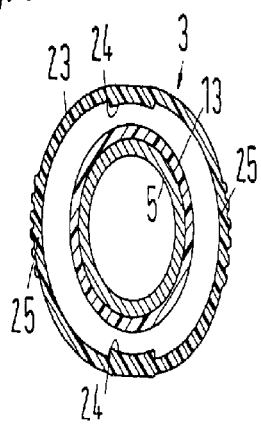
FIG. 4 is the sectional view IV-IV of FIG. 3.
Figure 3:
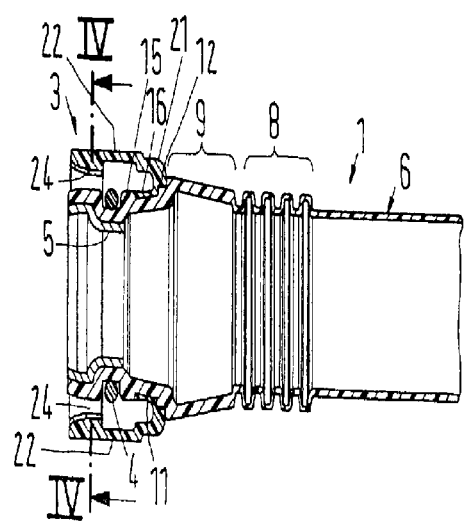
FIG. 3 is the same axial sectional view as in FIG. 1, however, without the pipe which is connected to the fluid line.

The connection arrangement according to FIG. 1 is composed of a fluid line, a pipe 2, a connecting ring 3, a sealing ring 4 and a support ring 5. While the parts 1 to 3 are of thermoplastic material and the sealing ring 4 has an elastomer or rubber, the support ring 5 is preferably of metal; however, the support ring 5 may also be of plastic material, particularly hard or reinforced synthetic material.

The fluid line is used in motor vehicles, for example, as a fuel or cooling water line. The fluid line is composed of a principal part 6 and an end section 7, as seen in FIG. 5. The principal 6 has at least one undulated section 8 in order to increase the flexibility of the part 6, so that the fluid line 1 can be bent more easily at least in the undulated end section 8 in order to adjust the fluid line onto the requirements of the narrow space condition in the motor vehicle.

The illustrated undulated section 8 is followed by the end section 7. The end section 7 has an essentially conical initial section 9 which is adjacent the undulated section 8, an intermediate section 10, as seen in FIG. 5 which is adjacent the initial section 9 and an outer circumferential locking groove 11 with teeth 12 for the engagement of a locking projection 16 with appropriate teeth and a holding rib 15 at an axial end of the connecting ring 3, wherein the locking projection 16 extends circumferentially on the inner side. The intermediate section 10 is followed by a section 13 having a free end, as seen in FIG. 5, which on the outer side has a groove 17 for receiving the sealing ring 4. The sealing ring receiving groove 17 forms on its inner side a rib, so that the sealing ring receiving groove 17 is stiff in itself in the manner of a corrugation.

A support ring 5 is located on the inner side of the sealing ring receiving groove 17. The support ring 5 is of metal, but may also be of hard synthetic material. The support ring 5 not only reinforces the sealing ring receiving groove 17, but may also compensate any non-round portions of this groove which have occurred during molding.

The fluid line 1 is manufactured by extrusion blow or vacuum molding by means of a corrugator. The circumferential speed of the corrugator during the shaping of the end section 7 is reduced relative to the feeding speed of the soft plastic material mass which is discharged form the extruder so that the plastic material mass is obstructed in the area of the end section 7 and the wall of the end section 7 will be at least twice as thick as that of the principal part 6. The wall thickness of the principal part 6 is preferably 0.3 to 1.4 mm and the wall thickness of the end section 7 is about 1.5 to 3.5 mm. Consequently, the end section 7 is significantly stiffer than the principal part 6 of the fluid line 1, so that the end section 7 is capable of bearing higher loads. In addition or as an alternative to the thicker construction of the end section 7, the end section may also have at least one of the reinforcing materials from the group of glass fibers, mineral fibers, metal fibers or glass spheres.

The diameter of the initial section 9 increases from the principal part 6 to the free end of the end section 7 upward at least beyond the greatest shaft diameter of the principal part 6.

The pipe 2 has an end section 18, as seen in FIG. 1. The end section 18 has a circumferential holding rib 19 which defines a locking groove 14, wherein the holding rib 19 has an inclined side 20 which acts as an oblique contact surface. The pipe 2 may simultaneously form a portion of the outer wall of a housing, for example, of the radiator of an internal combustion engine in the motor vehicle, and may form the end section 18 of a pipe piece at the housing.

The connecting ring 3 has at its one axial end a circular closed ring 21. The ring 21 is provided n the inner side with a locking projection 16 for the engagement in the locking groove 11 and is provided with teeth for the engagement between the teeth 12. The locking projection 16 can be elastically expanded and is conical on the inside, so that it can be pushed past the holding rib 15 until it engages in the locking groove 11.

The ring 21 of the connecting ring 3 is additionally connected by two diametrically oppositely located resilient webs 22 having an oval ring 23 at the other axial end of the connecting ring 3. The ring 23 has on the inside thereof diametrically oppositely located locking projections 24 for engaging behind the holding rib 19 of the end section 18 in order to connect the fluid line 1 to the pipe 2 by inserting the end sections 7 locked to the connecting ring 3 into the end section 18.

The connection of the fluid line 1 and the pipe 2 can be separated by expanding the ring 23 at the end of the connecting ring 3 in the area of its locking projections 24 by exerting a pressure on the grooved arc 25 of the ring 3 which have the smaller radius of curvature to such an extent until the locking projections 24 are out of engagement from the holding rib 19 of the end section 18.

The engagement of the teeth 12 with those of the ring 21 serves as a means for preventing rotation between the connecting ring 3 and the end section 7 and facilitates the selection of a relative angle of rotation between the connecting ring 3 and the end section 7 in which the arcs 25 of the ring 29 are easily manually accessible in order to separate the connection.

The essentially conical shape of the initial section 9 makes it possible that excessive steps in the outer diameter of the first end section and in the connecting ring 3 can be avoided because the end sections 7 and 18 are inserted into one another and the connecting ring 3 must engage over both end sections 7, 18. In the same manner, outer diameter steps in the initial section 9 can be avoided in order to construct the outer diameter of the two holding ribs 15 and 19 essentially equal and to ensure that the outer diameter of the connecting ring 3 is also as much as possible without steps or with only flat steps. Moreover, the stepless shape of the conical initial section 9 has the advantage that, compared to a stepped shape, it requires less material and its wall thickness is not reduced during the blow molding or vacuum molding process in the area of any possible larger diameter steps as a result of the occurring expansion of the plastic material and, thus, its stiffness is also not reduced.

The modification of the connection arrangement shown in FIGS. 6 to 13 differs from that of FIGS. 1 to 5 essentially only in the configuration of the connecting ring 3a, so that equivalent parts of both connection arrangements are provided with the same reference numerals.

The fluid line according to FIGS. 6 to 9 differs in principle only from the fluid line according to FIGS. 1 to 5 in that the holding rib 15 is provided with an inclined contact surface 26 for the connecting ring 3a.

The connecting ring 3a is a spring ring and is not circumferentially closed but is provided with a slot 27 which extends from its axial end to the other end for the engagement of a spreading tool, in order to widen the connecting ring 3a for separating the connection of the fluid line 1 and the pipe 2. The ring has at its axial ends no circumferentially extending projections, but separate locking projections 28 and 29, wherein the locking projections 28 are offset in the circumferential direction relative to the locking projections 29, so that the intermediate spaces of the locking projections 28 coincide with the locations of the locking projections 29 and vice versa, in order to be able to remove the ring unimpededly out of the molding tool where it is manufactured of plastic material.

The connecting ring 3a is provided in the axial middle thereof with a stiffening rib 30 which extends in the circumferential direction. Alternatively, the connecting ring 3a may also be of metal, preferably spring steel. The stiffening ribs 30 can then be omitted.

The connecting ring 3a is provided at one edge of the slot 27 with a lug 31 which extends in the circumferential direction of the connecting ring 3a and engages in a U-shaped recess at the oppositely located edge of the slot 27. This makes it possible to prevent the circumferential ends of the connecting ring 3a which define the slot 27 from moving axially relative toward each other, so that a reliable engagement of the holding ribs 15, 19 by the respective locking projection 28, 29 is ensured.

The spreading tool for opening the connecting ring 3a for disengaging the locking projections 28, 29 with the holding ribs 15, 19, is placed between the free end of the lug 31 and the opposite edge of the slot 27.

The locking groove 11 in the intermediate section 10 of the fluid line 1 in accordance with the modifications of FIGS. 6 through 9, can be provided with teeth for the same purpose as the fluid line according to FIG. 5 which engage between the locking projections 28 in a similar manner as between teeth.

Instead of the O-ring shown as a sealing ring 4, a sealing ring can be provided which has at least one sealing lip and is injection molded of an elastomer material into the sealing ring receiving groove 17. Such a sealing ring has a high sealing capacity and does not have to be assembled separately.

The fluid line 1 can in both embodiments be provided at both ends thereof with an end section which is the same as the end section 7.

While specific embodiments of the invention have been shown and described in detail to illustrate the inventive principles, it will be understood that the invention may be embodied otherwise without departing from such principles.

We claim:

1. A fluid line of thermoplastic material, the fluid line comprising:
at least one first end section integral and formed in one piece with a principal part of the fluid line which is at least partially undulated;
the at least one first end section having at least one outer circumferential sealing ring receiving groove, and
the at least one first end section having a first holding rib engaging behind at least one first locking projection of a connecting ring, the connecting ring having at least one second locking projection engaging behind a second holding rib on a second end section of a pipe, the first end section being insertable into the second end section connecting the fluid line to the pipe by means of the connecting ring,
wherein the first end section has an essentially conical initial section located adjoining the undulated portion of the principal part of the fluid line,
wherein the essentially conical end section has an outer diameter which increases in a direction toward a free end of the first end section and extends radially past a greatest outer diameter of the principal part, the initial section adjoining an intermediate section whose outer diameter decreases from the greatest diameter of the initial section to the smallest diameter of a locking groove for the engagement of a first locking projection, wherein the wall of the first end section is stiffer than the entire wall of the principal part of the fluid line;
wherein the wall thickness of the first end section is thicker than the wall thickness of the principal part of the fluid line;
wherein the wall of the first end section is configured to form the sealing ring receiving groove in the radially outer side of the at least one first end section and forms a rib on a radially inner side of the at least one first end section.

2. The fluid line according to claim 1, wherein the wall thickness of the first end section is at least twice the wall thickness of the principal part of the fluid line.

3. The fluid line according to claim 1, wherein the first end section comprises at least one of the reinforcing materials selected from the group consisting of glass fibers, mineral fibers, metal fibers and glass spheres.

4. The fluid line according to claim 1, wherein the first end section has at least one tooth for engagement between teeth of the connecting ring.

5. The fluid line according to claim 1, wherein the sealing ring receiving groove has a support ring on a radially inner side of the fluid line.

6. The fluid line according to claim 5, wherein the support ring is of metal.

7. A connection arrangement, the connection arrangement comprising a pipe and a fluid line connected to the pipe, wherein the fluid line is of thermoplastic material and the fluid line comprises:
at least one first end section integral and formed in one piece with a principal part of the fluid line which is at least partially undulated,
the at least one first end section having at least one outer circumferential sealing ring receiving groove; and
the at least one first end section having a first holding rib engaging behind at least one first locking projection of a connecting ring, the connecting ring having at least one second locking projection for engaging behind a second holding rib on a second end section of the pipe, the first end section being insertable into the second end section for connecting the fluid line to the pipe by means of the connecting ring,
wherein the first end section has an essentially conical initial section located adjoining the undulated portion of the principal part of the fluid line,
wherein the essentially conical initial section has an outer diameter which increases in a direction toward a free end of the first end section and extends radially past at least the greatest outer diameter of the principal part, the initial section adjoining an intermediate section whose outer diameter decreases from the greatest diameter of the initial section to the smallest diameter of a locking groove for the engagement of a first locking projection;

wherein the wall of the first end section is stiffer than the entire wall of the principal part of the fluid line;

wherein the wall thickness of the first end section is thicker than the wall thickness of the principal part of the fluid line;

wherein the wall of the first end section is configured to form the sealing ring receiving groove in the radially outer side of the at least one first end section and forms a rib on a radially inner side of the at least one first end section.

8. The connection arrangement according to claim 7, wherein the sealing ring receiving groove has a support ring at the radially inner side of the support ring.

* * * * *

UNITED STATES PATENT AND TRADEMARK OFFICE
CERTIFICATE OF CORRECTION

| | |
|---|---|
| PATENT NO. | : 7,984,931 B2 |
| APPLICATION NO. | : 11/900487 |
| DATED | : July 26, 2011 |
| INVENTOR(S) | : Janos Kertesz et al. |

It is certified that error appears in the above-identified patent and that said Letters Patent is hereby corrected as shown below:

Title Page, Item (30) Foreign Application Priority Data should read

Sep. 15, 2006   (DE) .................................10 2006 043 461

Signed and Sealed this
Eighteenth Day of October, 2011

David J. Kappos
*Director of the United States Patent and Trademark Office*